United States Patent [19]

Solarek et al.

[11] Patent Number: 4,876,336

[45] Date of Patent: Oct. 24, 1989

[54] AMPHOTERIC STARCHES AND PROCESS FOR THEIR PREPARATION

[75] Inventors: Daniel B. Solarek, Bridgewater; Teresa A. Dirscherl, N. Plainfield; Henry R. Hernandez, Bridgewater; Wadym Jarowenko, Green Brook, all of N.J.

[73] Assignee: National Starch and Chemical Corporation, Bridgewater, N.J.

[21] Appl. No.: 50,649

[22] Filed: May 18, 1987

Related U.S. Application Data

[63] Continuation-in-part of Ser. No. 896,546, Aug. 13, 1986, abandoned.

[51] Int. Cl.$^4$ .................. C08B 31/02; C08B 33/02; C08B 35/02
[52] U.S. Cl. ...................... 536/109; 536/50; 536/107; 536/102
[58] Field of Search .................. 536/50, 102, 107, 109

[56] References Cited

U.S. PATENT DOCUMENTS

| | | | |
|---|---|---|---|
| 2,824,870 | 2/1958 | Neukom | 536/120 |
| 2,961,440 | 11/1960 | Kerr et al. | 536/107 |
| 3,459,632 | 8/1969 | Caldwell et al. | 536/50 |
| 3,562,103 | 2/1971 | Moser et al. | 536/50 |
| 4,166,173 | 8/1979 | Wurzburg et al. | 536/109 |
| 4,216,310 | 8/1980 | Wurzburg et al. | 536/09 |
| 4,566,910 | 9/1986 | Hubbard et al. | 536/109 |
| 4,579,944 | 4/1986 | Harvey et al. | 536/50 |

OTHER PUBLICATIONS

K. W. Britt, TAPPI Journ., Jan. 1984, pp. 102-103, "Water Removal During Paper Sheet Formation".

A. M. Springer et al., TAPPI Journ., Feb. 1984, pp. 104-108, "The Influence of Starch on Drainage and Retention in Paperboard Mill Systems".

*Primary Examiner*—John Kight
*Assistant Examiner*—Nathan M. Nutter
*Attorney, Agent, or Firm*—Edwin M. Szala; Ellen T. Dec

[57] ABSTRACT

Improved amphoteric starch derivatives containing tertiary amino or quaternary ammonium groups and anionic phosphate groups are disclosed. The derivatives which are defined by a minimum bound phosphorus content, a minimum viscosity and other criteria have use as wet-end additives and provide improved drainage properties in the manufacture of paper.

15 Claims, No Drawings

AMPHOTERIC STARCHES AND PROCESS FOR THEIR PREPARATION

BACKGROUND OF THE INVENTION

This application is a continuation-in-part of Ser. No. 896,546 filed Aug. 13, 1986 and now abandoned.

This invention relates to improved amphoteric starch derivatives containing both cationic substituent groups and anionic phosphate groups. The invention also relates to a process for preparing these amphoteric starches and their use as wet-end additives showing improved drainage in the manufacture of paper.

As used herein, the term "paper" includes sheet-like masses and molded products made from fibrous cellulosic material, which may be derived from natural sources as well as from synthetics such as polyamides, polyesters and polyacrylic resins, as well as from mineral fibers such as asbestos and glass. Also included are papers made from combinations in cellulosic and synthetic materials. Paperboard is also included, within the broad term "paper".

It has been known to add various materials, including starch, to the pulp, or stock, during the papermaking process, prior to the formation of the sheet. The purpose of such additives has been mainly to bind the individual fibers to one another, thus aiding the formation of a stronger paper.

In the case of those papers which contain added pigments, such for example as titanium dioxide, it has been known to add materials to the pulp, or stock, for the specific purpose of retaining a greater proportion of such pigments in the paper (rather than have them drain off in the water that is removed during the formation of the sheet). Such additives are often referred to as "pigment retention agents".

Anionic and cationic starches as well as amphoteric starches have long been used as additives in papermaking for their contributions to strength and pigment retention in the paper. See, for example, U.S. Pat. Nos. 3,459,632 to Caldwell et al. and 3,562,103 to Moser et al.

In recent years, in an effort directed to improving machine speeds, reducing drying time and generally improving cost, paper makers have begun to focus on the efficiency of water removal or drainage during the sheet-forming process. See, for example, the article by K. W. Britt in TAPPI Journal, Jan. 1984, p 102–103 and the article by A. M. Springer et al., TAPPI Journal, Feb. 1984 p 104–108. In ordinary papermaking operations employing Fourdrinier type machines, the pulp furnish or stock is fed from a headbox onto a wire screen where the web is first formed. Water is drained from the stock by gravity and by vacuum suction, and then by pressing. Drainage efficiency is affected by a number of factors including the composition and pH of the furnish. It can be understood that even minor improvements in drainage efficiency can have significant beneficial effects on the economics of paper manufacturing due primarily to the large volumes of paper which are produced.

While starch additives of the prior art used for strength and pigment retention also show some favorable effects on improving drainage performance, we have found that the use of the amphoteric starch additives described hereinbelow, meeting specified criteria particularly with respect to bound phosphorus, surprisingly provide improved drainage with no untoward effects on strength or pigment retention. Testing results have shown that the amphoteric starch additives of the present invention will typically improve drainage by 20–30% over a representative commercially used amphoteric starch additive.

Accordingly, one object of the invention is to provide a process for preparing amphoteric starches meeting criteria with respect to molecular weight, bound phosphorus, cationic degree of substitution, and the ratio of anionic to cationic groups.

Another object of the invention is to provide an improved amphoteric starch containing cationic groups and anionic phosphate groups meeting criteria with respect to molecular weight, bound phosphorus, cationic D.S., and the ratio of anionic to cationic groups.

A further object of the invention is to provide an amphoteric starch for use as a wet-end additive showing improved drainage in the manufacture of paper.

SUMMARY OF THE INVENTION

The novel additives of our invention are starch derivatives containing cationic groups, together with a controlled amount of anionic phosphate groups. The derivatives are prepared by treating a suitable starch to provide it with tertiary amino or quaternary ammonium cationic groups and thereafter treating it with a selected inorganic phosphate reagent. In reacting the starch with the cationic and phosphate reagents, conditions must be employed to avoid crosslinking and also avoid degradation of the starch so that, in effect, there is a preservation of molecular weight. The molecular weight of the starch derivative can be conveniently correlated to its viscosity, as measured on a starch dispersion (2.0% by weight, dry basis) in potassium hydroxide (KOH) using a Brookfield Viscometer at 10 rpm. The starch derivative herein must possess a viscosity of at least 800 cps, and preferably above 1,000 cps. Viscosity measurements below about 800 are indicative of a detrimental degradation of the starch which renders it unsuitable for use herein. The starch derivative must also contain at least a specified minimum amount of bound phosphorus. We have found that to obtain improved drainage, it is necessary that the starch contain at least 0.12% of bound phosphorus and preferably about 0.14%. If other criteria are met, it appears that higher concentrations of phosphorus in the derivative lead to improved drainage performance.

In order to be most effective as an additive in the process of our invention, the selected starch derivative should have a ratio of anionic, i.e., phosphate groups to cationic groups, (A/C) ratio, within the range of from about 0.12 to 0.55 moles of anionic groups per mole of cationic group. Furthermore, the starch derivatives should be substituted with cationic groups to such an extent that their degree of substitution (D.S.) i.e., the average number of cationic groups per anhydroglucose unit of the starch molecule ranges from about 0.010 to 0.080.

Suitable starches which may be employed in the process include, for example, starches derived from corn, waxy maize, potato, tapioca, rice, sago, sorghum and wheat. Also included are starches which have higher amylose contents, e.g., 35% or more by weight of amylose. Preferred starches useful herein are waxy maize, corn, tapioca, potato and blends of these starches. It is to be noted that the starch base employed herein is usually in its granular form, i.e., it should be any amylaceous material which has not lost its granular polarization crosses and is capable of swelling. However, it is possible in the practice of this invention to employ a granular starch of which a small portion has been partially swelled by any known means or homogenized by subjecting it to shear.

DETAILED DESCRIPTION

As the cationic substituent in our starch additive, we prefer tertiary amino or quaternary ammonium groups. However, other cationic groups are operable as, for example, primary and secondary amine groups, sulfonium and phosphonium groups. The preparation of aminoalkyl ethers of starch, wherein the starch derivative contains tertiary amine groups, is described in U.S. Pat. No. 2,813,093. Similarly, sulfonium and phosphonium derivatives of starch are described in U.S. Pat. Nos. 2,989,520 and 3,077,469 respectively.

It is known that quaternary amine groups may be introduced into the starch molecule either by suitable treatment of the tertiary aminoalkyl ether of starch, as described for example in U.S. Pat. No. 2,813,093, or quaternary groups may be introduced directly into the starch molecule as, for example, by treatment with the reaction product of an epihalohydrin and a tertiary amine or tertiary amine salt.

Other suitable cationic starch derivatives will be apparent to the practioner, it being remembered that our process may employ any starch derivative which contains a cationic (i.e. electrically positively charged) moiety in the starch molecule. Preferred starches herein for further substitution with phosphate groups are the diethylaminoethyl ether or 2-hydroxypropyl trimethylammonium ether of waxy maize, corn, tapioca and potato starch.

As stated, the starch derivative, to be suitable as an additive to paper pulp in the process of our invention, must also contain a controlled amount of anionic phosphate groups.

Techniques for phosphorylating a starch base are known to those skilled in the art. Thus, U.S. Pat. Nos. 2,824,870; 2,884,412 and 2,961,440 disclose various phosphorylation techniques consisting, essentially, of heat reacting starch impregnated with a phosphate salt of an alkali metal, within a prescribed pH range. Abovementioned U.S. Pat. No. 3,562,103 directed to starches containing quaternary and anionic phosphate groups discloses a preferred method of phosphating a starch which comprises forming an aqueous starch slurry at room temperature and adding a suitable concentration of phosphate reagent. Preferably the pH is adjusted to between 4 and 6, although it is stated that a range of 4 to 11.5 may be used. The starch is filtered without washing and adjusted to a moisture level of about 20% or below, preferably from about 5 to 20% by weight at a temperature of less than about 70° C. The starch-phosphate composition is then roasted at a temperature of 100°-160° C. until the product has the desired level of anionic phosphate groups.

In U.S. Pat. No. 4,166,173 to O. B. Wurzburg et al., which disclosure is incorporated herein by reference, starch is phosphorylated by an improved pollution-free process which involves forming a concentrated reagent solution of alkali metal tripolyphosphate salt and impregnating therewith a starch cake containing no more than 45% by weight of moisture. Drying and heat reacting the thus impregnated starch provides the phosphorylated starch. In preparing the concentrated reagent solution during addition of the tripolyphosphate salt to the water, one or more acids are added to control the pH at between 2.8 and 5.0.

For the purpose of this invention, the phosphorylation may be carried out by any known techniques provided that the heating of the starch and phosphate salt is carried out at a pH between 5.5 and 8.5, and preferably 6.0 to 8.5, and is limited to reactions of starch with sodium or potassium tripolyphosphate, sodium or potassium hexametaphosphate and sodium or potassium pyrophosphate salts yielding orthophosphate mono-ester groups, i.e., mono-starch phosphates. Other alkali metal salts may be used in place of sodium or potassium which are preferred as the phosphating reagent.

Thus, in carrying out phosphorylations employing an aqueous starch slurry, the pH of the starch slurry containing the phosphorylating reagent is adjusted to about 5.5 to 8.5. Use of pH levels below about 5.5 will result in a degraded starch while use of pH levels above about 8.5 may produce undesirable crosslinking. If phosphorylation is to be carried out by spraying the reagent, a starch slurry is ordinarily prepared and adjusted to be within the designated pH range and is then filtered. The reagent is sprayed onto the pH adjusted starch cake. The practitioner will recognize that it is also possible to prepare the filter cake at a slightly alkaline pH and impregnate it with an acidic solution of phosphate reagent such that the final pH of the starch-phosphate reagent mixture is within the defined pH range. The specific reagent used may require adjustments of pH levels. For example, sodium tripolyphosphate (STP) has limited solubility in water (14.5 g/cc at 25° C.). In order to achieve higher solids solutions, the pH is maintained at 4.0-6.0 by addition of acid such as HCl or $H_3PO_4$ during dissolution of the salt. In contrast, sodium hxametaphosphate $(NaPO_3)_6$ shows very high solubility and concentrated solutions (20-36%, by weight) can be prepared with no pH adjustment. The amount of phosphorylating reagent used will depend on the reagent and is selected so that the resultant starch derivative contains at least 0.12% of bound phosphorus. By the term "bound phosphorus" we mean phosphorus which is attached by an ester linkage to a hydroxyl group of the anhydroglucose backbone of the derivatized starch.

Most commonly, the amount of phosphorylating reagent employed will range from about 0.5 to 12% by weight of dry starch. For example, treatment of waxy maize with 3.5 to 4.0% of sodium tripolyphosphate will give a starch containing 0.14 to 0.22% of bound phosphorus. The starch cake containing the phosphorylating reagent is dried to a moisture less than about 9.0% and preferably from about 2.0 to 7.0% prior to the requirdd heat reaction or roasting at higher temperatures. Ordinarily, the dry mixture of starch and phosphorylating reagent is heated to temperatures of from about 110°-140° C. and preferably will range from about 130°-135° C. during the phosphorylation reaction. The heating period may range from 0.1 to 4 hours or more depending on the selected reagent, pH, temperature, etc. Care must be taken to avoid prolonged heating at higher temperatures of the starch-reagent blend during the phosphorylation reaction to avoid possible degradation of the starch. Higher temperatures and/or longer heating periods can be tolerated when the pH of the blend is within the upper portion of the designated pH range.

The starch additives of our invention may be effectively used for addition to pulp prepared from any types of cellulosic fibers, synthetic fibers, or combinations. Among the cellulosic materials which may be used are bleached and unbleached sulfate (kraft), bleached and unbleached sulfite, bleached and unbleached soda, neutral sulfite, semi-chemical, chemiground wood, ground wood or any combination of these fibers. Fibers of the viscose rayon or regenerated cellulose type may also be used if desired.

Any desired inert mineral fillers may be added to the pulp which is to be modified with our improved starch derivatives. Such materials include clay, titanium dioxide, talc, calcium carbonate, calcium sulfate and diatomaceous earths. Rosin may also be present, if desired.

With respect to the proportion of the starch derivative to be incorporated with the paper pulp, we have found that this may vary in accordance with the particular pulp involved. In general, we prefer to use about 0.05 to 1.0% of the starch derivative, based on the dry weight of the pulp. Within this preferred range the precise amount which is used will depend upon the type of pulp being used, the specific operating conditions, and the particular end-use for which the paper is intended. The use of amounts of starch derivative greater than 1%, on the dry weight of the pulp, is not precluded, but is ordinarily unnecessary in order to achieve the desired improvements. The described derivatives are used as wet-end, beater additives, although they also may be added to the pulp while the latter is in the headbox or hydropulper. When added in the proper concentrations, our starch derivatives serve to increase pigment retention and paper strength, while significantly improving drainage efficiency in the papermaking process.

Thus it is seen that the starch derivatives employed in our process containing cationic and anionic groups in carefully balanced ratios and meeting other specified criteria relating to bound phosphorus and preservation of molecular weight, yield a combination of benefits in the manufacture of paper. The wet-end additives of our invention not only provide pigment retention and strength to the paper but surprisingly provide improved drainage performance not obtainable with amphoteric starch additives of the prior art.

In the examples which follow, the bound phosphorus was determined on washed starch samples which were burned by Schöniger combustion, and the percent phosphorus was determined colorimetrically by forming molybdophosphoric complexes or determined by atomic emission spectroscopy.

All viscosity measurements of the starch derivatives were determined by a procedure using 2.0 g (db) of a washed, salt free starch sample suspended in 50 ml of distilled water. The starch and water are stirred at 260 rpm using a mechanical stirrer with a flat, stainless steel paddle (1.25" in height, 1.5" at the top tapered to 1.0" at the bottom). While the starch mixture is stirring, 50 ml of 5.0N KOH are added and stirring is continued for a total of 5 minutes starting with the addition of KOH. The viscosity of the dispersion is measured at room termperature within a 0.5 hours of adding the KOH, using a RVT Brookfield Viscometer employing a No. 4 spindle at 10 rpm.

Drainage performance of the various additives was carried out employing a Britt Jar modified by having an extended mixing cylinder and an agitator set at 250 rpm. Unbleached softwood Kraft is beaten to a 550 ml CSF and diluted to 0.5% consistency. Alum (3.3% by weight of the pulp) is added to the stock and the pH is adjusted to 5.5.

An amount of starch to be evaluated (1.0% db by weight of fiber), cooked for about 20 minutes, is added to a 345 ml aliquot of the pulp suspension with agitation. The suspension is then added to the Britt Jar which already contains 1,500 ml of water and the agitator is turned on. A stopper is removed from the base of the jar and the time required for 1,200 ml of water to drain through the wire screen in seconds is noted. The drainage rate is calculated in terms of ml/sec. In the examples, drainage efficiency or performance is expressed as % of the control.

The following examples will further illustrate the embodiment of this invention.

EXAMPLE I

This example illustrates the preparation of four amphoteric starch derivatives of the present invention prepared in accordance with the process of the invention. Additionally, the example illustrates the effect of phosphorylation pH on the drainage performance of the resulting starch derivative.

The following ingredients were charged into a reaction vessel fitted with means for heating and mechanical agitation:

Waxy maize (about 10% moisture) . . . 7,500 g
Water . . . 8,250 ml

Under agitation, the slurry temperature was raised to 37° C. and the pH was raised to 11.2 to 11.5 using an aqueous solution of sodium hydroxide (4% by weight). With agitation, 600 g of a 50% by weight aqueous solutin of diethylaminoethylchloride HCl (DEC) were added to the slurry while maintaining the pH between 11.0 and 11.5. The latter mixture was allowed to react at 37° C. for 17.5 hours. The final pH of the system was 11.3. After the reaction was completed, the pH level was adjusted to pH 7.0 with dilute (10%) hydrochloric acid and filtered. The cake was washed with 16,500 ml of water and air-dried at room temperature. It was found to have a nitrogen content of 0.33%, by weight on a dry basis (db), corresponding to a cationic D.S. of 0.038.

Six portions of this cationic starch were phosphorylated at pH levels of from 5.0 to 7.4 by the following general procedure:

Slurries were prepared by adding 1,200 g of starch to 1,500 ml of water, followed by the addition of 60 g of sodium tripolyphosphate (STP). The pH of each slurry was adjusted as indicated in Table I using 10% hydrochloric acid. The slurries were filtered and the starch filter cakes were flash dried at about 82°–99° C. to a moisture content of 5.0 to 7.0%. Based on phosphorus analysis of the dried starches, approximately 35 g of STP were retained on the starch.

The dry-heat phosphorylation was carried out in an oil-jacketed reaction vessel equipped with a mechanical stirrer. The jacket was heated to 168°–170° C. The STP-impregnated starch was added to the heated vessel, allowed to stir gently until the starch temperature reached 133° C., (approximately 13–15 minutes) and was then allowed to cool to room temperature.

The bound phosphorus, viscosity and drainage performance were determined as described above with the results summarized in Table I.

TABLE I

| Sample | Adjusted pH | % Bound Phosphorus | A/C | Visc. cps. | Drainage Efficiency % of Control |
|---|---|---|---|---|---|
| Control* | | 0.10 | 0.173 | 400 | 100 |
| A | 5.0 | 0.20 | 0.273 | 400 | 88 |
| B | 5.5 | 0.20 | 0.273 | 1,400 | 121 |
| C | 6.0 | 0.17 | 0.233 | 1,500 | 127 |
| D | 6.5 | 0.17 | 0.233 | 2,400 | 126 |
| E | 7.0 | 0.17 | 0.233 | 2,050 | 131 |
| F** | 7.4 | 0.17 | 0.233 | 2,400 | 124 |

*The control is waxy maize containing about 0.26% cationic tertiary nitrogen (D.S. of 0.030) and about 0.10% of bound phosphorus.
**Sample F was heated to 131° C. in 40 minutes during the phosphorylating heat reaction.

The data in the above table indicates that a pH level lower than about pH 5.5 during the phosphorylating heat reaction leads to a degradation of the amphoteric starch. Thus, Sample A which was phosphorylated at pH 5.0 shows a drainage performance which is significantly less than that of the control.

EXAMPLE II

This example illustrates the preparation and improved drainage of an amphoteric starch of the invention containing quaternary ammonium cationic groups.

The following ingredients were charged into a reaction vessel fitted with means for heating and mechanical agitation:

waxy maize (about 10% moisture) ... 2,500 g
water ... 3,750 ml

Under agitation, the slurry temperature was raised to 43° C. and the pH was adjusted to 11.2–11.5 using an aqueous solution of sodium hydroxide (4% by weight). With agitation, 208 g of a 60% active, aqueous solution of 3-chloro-2-hydroxypropyltrimethyl ammonium chloride were added and the mixture was allowed to react at 43° C. for 24 hours. The final pH of the system was 11.6. After the reaction was completed, the slurry was neutralized to pH 7.0 with 10% hydrochloric acid and recovered as described in Example I. The final product was found to contain 0.32% nitrogen by weight (db) corresponding to a cationic D.S. of 0.037.

About 1,000 g of the quaternary ammonium starch was slurried in 1,250 ml of water containing 40 g STP at pH 7.0. After filtering, flash-drying and heating as described in Example I, the starch was allowed to cool to room temperature. The starch contained 0.14% bound phosphorus, its viscosity was 2,700 cps, and the A/C ratio was 0.198. Drainage performance was 129% of the control of Example I.

EXAMPLE III

In this example, a cationic starch base was phosphorylated by impregnation with the phosphorylating reagent to produce the amphoteric starch derivative of the invention.

Cationic waxy maize (1,200 g) was prepared by reaction with DEC as described in Example I except that the final slurry was neutralized to pH 8.0, filtered and not washed. A solution of STP reagent was prepared by dissolving 48 g of the salt in 126 g of water while maintaining the pH at 5.0. The solution was sprayed onto the starch filter cake, and the starch-STP blend was flash-dried and heat reacted as described in Example I. The pH of the starch-STP blend prior to heat reaction was 6.9. The blend was heated and reached a temperature of 133° C. in 9 minutes and was then allowed to cool to room temperature. The amphoteric starch contained 0.17% of bound phosphorus and its viscosity was 2,000 cps. The A/C ratio was 0.233. Drainage performance was 130% of the control of Eaample I.

EXAMPLE IV

This example illustrates the use of various starch bases and various nitrogen contents in preparing the amphoteric starch additives of this invention.

Samples of potato, tapioca and waxy maize were cationically substituted as described in Examples I or II. The phosphorylation reactions were carried out as described in Example III. The samples and test results are summarized in Table II. Drainage efficiency was measured against the control of Example I.

TABLE II

| Sample | Starch Base | % Bound Phosphorus | A/C | % N Tert. | % N Quat. | Visc. cps. | Drainage Efficiency % of Control |
|---|---|---|---|---|---|---|---|
| A | Potato | 0.18 | 0.233 | — | 0.35 | 1,200 | 131 |
| B | Potato | 0.15 | 0.322 | — | 0.21 | 1,350 | 123 |
| C | Tapioca | 0.16 | 0.425 | — | 0.17 | 800 | 122 |
| D | Tapioca | 0.16 | 0.278 | — | 0.26 | 1,000 | 129 |
| E | W. Maize | 0.14 | 0.253 | 0.25 | — | 1,650 | 136 |
| F | W. Maize | 0.18 | 0.280 | 0.29 | — | 1,500 | 135 |
| G* | W. Maize | 0.06 | 0.085 | 0.32 | — | 2,300 | 100 |

*Sample G does not meet the bound phosphorus specification and is not within the scope of the present invention.

EXAMPLE V

This example illustrates the use of sodium hexametaphosphate as the phosphorylating reagent.

Waxy maize starch (1,200 g) was reacted with 4% DEC on the starch (db) as described in Example I. After the reaction was completed, the pH level was adjusted to pH 7.0, filtered and was used in the phosphorylating step without washing. The nitrogen content was 0.33% (db).

An aqueous solution of sodium hexametaphosphate (SODAPHOS ®, supplied by FMC Corporation), was prepared by dissolving 42 g of the reagent in 100 ml of water. The phosphate solution having a pH of 7.0 was sprayed onto the cationic starch filter cake as described in Example III. The starch was heated and reached 134° C. in about 7 minutes during the heat reaction. The starch contained 0.14% (db) of bound phosphorus. The A/C ratio was 0.192%. Drainage performance was 124% of the control of Example I.

EXAMPLE VI (Comparative)

This example shows the unsuitability of sodium orthophosphate as the phosphorylating reagent for preparing the starch derivatives of the present invention. The use of sodium orthophosphate to prepare amphoteric starches is described in U.S. Pat. No. 3,562,103 to Moser et al.

A cationic waxy maize starch containing 0.32% nitrogen by weight (db) corresponding to a cationic D.S. of 0.037, as prepared in Example II above, was used herein.

About 1,100 g of the quaternary ammonium starch was slurried in 1,200 ml of water, and 14.4 g of disodium hydrogen phosphate and 81.4 g of sodium dihydrogen phosphate were added while maintaining the pH at 5.6. The slurry was filtered and the cake dried to a moisture content of about 10%. Based on a phosphorus analysis of the dried starch, approximately 63% of the phosphorus salt was retained on the starch. The dry heat reaction of the phosphate impregnated starch was carried out in a draft oven pre-heated to 145° C. keeping the starch (spread on trays) in the oven for 60, 90 and 120 minutes, samples A, B and C respectively, and cooling to room temperature.

The bound phosphorus, viscosity and drainage performance of these amphoteric starches were determined with the results summarized as follows:

| Sample | Heating Time | % Bound Phosphorous | A/C | Visc. cps. | Drainage Efficiency % of Control |
|---|---|---|---|---|---|
| A | 60 min. | 0.09 | 0.127 | 600 | 83 |
| B | 90 min. | 0.16 | 0.226 | 200 | 82 |
| C | 120 min. | 0.18 | 0.254 | 150 | 90 |

*The control is the waxy maize control of Example I.

The orthophosphate reagents require longer heating and higher temperatures as compared to sodium tripolyphosphate which leads to degradation of the molecular weight (evidenced by the low viscosity of the samples) and loss of drainage performance.

The skilled practitioner will recognize that variations and alterations may be made without departing from the scope of the invention as defined by the following claims.

What is claimed is:

1. A process for preparing an amphoteric starch derivative which comprises:
   (a) providing an aqueous slurry of a non-degraded starch derivative containing tertiary amino or quaternary ammonium cationic substituent groups having a D.S. of from about 0.010 to 0.080,
   (b) adjusting the pH level of the slurry to about pH 5.5–8.5,
   (c) adding to the aqueous starch slurry a phosphate salt selected from the group consisting of tripolyphosphate, hexametaphosphate, and pyrophosphate alkali metal salts, while maintaining the pH level at 5.5–8.5,
   (d) filtering the slurry,
   (e) drying the resultant cake to a moisture of 9.0% or below,
   (f) heat reacting the dried starch at a temperature of about 110°–140° C. for a period of 0.1 to 4.0 hours, and
   (g) recovering the amphoteric starch derivative, wherein the resultant starch derivative has a bound phosphorus content of at least 0.12%, a viscosity of at least 800 cps, and a ratio of anionic to cationic groups of from about 0.12 to 0.55.

2. The process of claim 1 wherein step (a) the starch derivative contains tertiary amino groups and is a diethylaminoethyl ether of starch.

3. The process of claim 1 where in step (a) the starch derivative contains quaternary ammonium groups and is a 2-hydroxypropyl trimethylammonium ether of starch.

4. The process of claim 1 wherein the starch derivative employed in step (a) is waxy maize, corn, tapioca or potato starch.

5. The process of claim 1 wherein step (c) the slurry is adjusted to a pH level of 6.0–8.0, and the starch derivative of step (g) has a bound phosphorus content of at least 0.14% and a viscosity of at least 1,000 cps.

6. The process of claim 5 wherein the starch derivative of step (a) contains tertiary amino groups and is a diethylaminoethyl ether of starch.

7. The process of claim 5 wherein the starch derivative of step (a) contains quaternary amino groups and is a 2-hydroxypropyl trimethylammonium ether of starch.

8. A process for preparing an amphoteric starch derivative which comprises:
   (a) providing an aqueous slurry of a non-degraded starch derivative containing tertiary amino or quaternary ammonium cationic substituent groups having a D.S. of from about 0.010 to 0.080,
   (b) adjusting the pH level of the slurry to about pH 5.5–8.5,
   (c) filtering the slurry to provide a starch cake containing no more than 45% of moisture,
   (d) forming a reagent solution of an alkali metal tripolyphosphate or hexametaphosphate salt which comprises water and 20–36% by weight of said salt,
   (e) adding 2–30% by weight of said reagent solution based on the weight of the starch to said starch cake to achieve efficient impregnation of the starch cake,
   (f) drying the resultant cake and heat reacting the dried starch-salt mixture which has a pH of 5.5 to 8.5 at a temperature of about 110°–140° C. for a period of 0.1 to 4.0 hours, and
   (g) recovering the amphoteric starch derivative, wherein the resultant starch derivative has a bound phosphorus content of at least 0.12%, a viscosity of at least 800 cps, and ratio of anionic to cationic groups of from 0.12 to 0.55.

9. The process of claim 8 wherein step (a) the starch derivative contains tertiary amino groups and is a diethylaminoethyl ether of starch.

10. The process of claim 8 wherein step (a) the starch derivative contains quaternary ammonium groups and is a 2-hydroxypropyl trimethylammonium ether of starch.

11. The process of claim 8 wherein the starch derivative employed in step (a) is waxy maize, corn, tapioca or potato starch.

12. An amphoteric starch derivative containing tertiary amino or quaternary ammonium cationic groups and anionic phosphate groups wherein said starch derivative has a D.S. of cationic groups of from about 0.010–0.080, a bound phosphorus content of at least 0.12%, a viscosity of at least 800 cps, and the ratio of anionic to cationic groups is within the range of from about 0.12 to 0.55 moles of phosphate groups per mole of cationic group.

13. The starch derivative of claim 12 wherein the starch is substituted with diethylaminoethyl ether groups and contains a bound phosphorus content of at least 0.14%.

14. The starch derivative of claim 12 wherein the starch is substituted with 2-hydroxypropyl trimethylammonium ether groups and contains a bound phosphorus content of at least 0.14%.

15. The amphoteric starch derivative of claim 12 wherein the starch is waxy maize, corn, tapioca or potato starch.

* * * * *